United States Patent
Bianchi et al.

[11] Patent Number: 5,891,405
[45] Date of Patent: Apr. 6, 1999

[54] CATALYST-SEAL SUPPORT DEVICE IN PARTICULAR FOR EXOTHERMIC HETEROGENEOUS CATALYTIC SYNTHESIS REACTORS

[75] Inventors: Luca Bianchi; Enrico Rizzi, both of Grandate, Italy

[73] Assignee: Methonal Casale S.A., Lugano-Besso, Switzerland

[21] Appl. No.: 750,570

[22] PCT Filed: Jul. 6, 1995

[86] PCT No.: PCT/EP95/02636

§ 371 Date: Dec. 16, 1996

§ 102(e) Date: Dec. 16, 1996

[87] PCT Pub. No.: WO96/02321

PCT Pub. Date: Feb. 1, 1996

[30] Foreign Application Priority Data

Jul. 18, 1994 [CH] Switzerland .......... 02 272/94

[51] Int. Cl.$^6$ .................. E04B 1/68; B01J 8/04
[52] U.S. Cl. .......... 422/191; 422/193; 422/211; 422/311; 277/650
[58] Field of Search .................. 422/311, 191, 422/192, 193, 221, 211; 277/650

[56] References Cited

U.S. PATENT DOCUMENTS

| | | | |
|---|---|---|---|
| 2,590,293 | 3/1952 | Armstrong | 422/311 |
| 2,614,034 | 10/1952 | Brummerstedt | 422/311 |
| 3,235,344 | 2/1966 | Dryer et al. | |
| 4,248,832 | 2/1981 | Aiken et al. | |
| 4,883,646 | 11/1989 | Zardi | 422/311 |
| 4,946,655 | 8/1990 | Whiteside, II et al. | 422/143 |
| 5,130,098 | 7/1992 | Zardi et al. | 422/148 |
| 5,409,670 | 4/1995 | Jaynes et al. | 422/179 |
| 5,527,512 | 6/1996 | Bachtel et al. | 422/143 |

FOREIGN PATENT DOCUMENTS

| | | |
|---|---|---|
| 0074815 | 3/1983 | European Pat. Off. |
| 0359952 | 3/1990 | European Pat. Off. |

*Primary Examiner*—Hien Tran
*Attorney, Agent, or Firm*—Sughrue, Mion, Zinn, Macpeak & Seas, PLLC

[57] ABSTRACT

An exothermic heterogeneous catalytic synthesis reactor including at least one catalytic bed 5a–5c arranged in a cylindrical shell 2 and provided with a bottom plate 6a–6c for containment of the catalyst, and at least one supporting shoulder 7a–7c for the bottom plate 6a–6c extending from the shell 2, includes a catalyst-seal support device including an annular element 17, 25 placed between the shoulder 7a–7c and the bottom plate 6a–6c. The annular element 17, 25 is fixed in a removable manner with the bottom plate 6a–6c and has a thermal expansion coefficient substantially equal to that of the shell 2.

17 Claims, 6 Drawing Sheets

CATALYST-SEAL SUPPORT DEVICE IN PARTICULAR FOR EXOTHERMIC HETEROGENEOUS CATALYTIC SYNTHESIS REACTORS

DESCRIPTION

1. Field of the Invention

The present invention relates to an exothermic heterogeneous catalytic synthesis reactor of the type comprising:

- a substantially cylindrical external shell,
- at least one catalytic bed arranged in said shell and comprising a bottom plate for containment of the catalyst,
- at least one supporting shoulder for said bottom plate extending from said shell.

As is known, when exothermic heterogeneous catalytic reactions are carried out within a synthesis reactor, the external shell and bottom plate of the catalytic beds arranged in the shell being subjected to a temperature increase undergo dimensional changes due to the thermal expansion of the materials which make them up. These dimensional changes can cause undesired phenomena at the connection zone between the shell and the bottom plate, such as for example outlet of the catalyst contained in the bed or damage to the bottom plate structure.

In the field of exothermic heterogeneous catalytic synthesis reactors there is an ever growing requirement for providing a device capable of ensuring between the external shell and the bottom plate of the catalytic beds an effective catalyst seal, constant and long lasting so as to avoid the drawbacks mentioned above.

2. Prior Art

In order to meet the above mentioned requirement, connection devices are provided between the external shell and the bottom plate of the catalytic beds, which comprise a compressible material, e.g. ceramic cords or braids, appropriately arranged in a space defined between the bottom plate and the shell, have become ever more widely used.

If in a reactor for heterogeneous synthesis of ammonia or methanol, the expansion coefficient of the material of the external shell, e.g. of low alloy steel, is different from that of the material of the bottom plate, e.g. of stainless steel, the high operating temperatures due to the exothermic nature of the reaction cause a dimensional variation of the shell on the order of 5 mm to 25 mm, which is much less than that of the bottom plate which is generally from 10 mm to 40 mm.

Consequently, the space between the bottom plate and the shell will be calculated at the time of installation sufficiently ample to allow for the different expansion rates of the materials.

The use of compressible material in the air space permits making a seal between the bottom plate and the shell capable of at least partially absorbing the thermal expansion of the materials.

In the terminology of the field this type of seal is generally termed stuffing box or packing box seal.

Although substantially meeting the purpose the above mentioned device exhibits a series of drawbacks as set forth below.

A first shortcoming is the fact that the device in accordance with the prior art is capable of absorbing only partially the dimensional variations caused by heat expansion of the materials. The compressible material arranged between the bottom plate and the external shell possesses indeed limited compressibility characteristics which make the stuffing or packing box seal effective only in situations of low differential expansion of the materials, such as for example if the different heat expansion between the bottom plate and the shell does not exceed 1 mm to 2 mm.

Consequently, in an ammonia or methanol synthesis reactor where, as seen above, there is a differential expansion of the materials of even 15 mm, the use of the above described device is unsatisfactory because during the various cooling/heating cycles which characterize the life of a reactor of this type, the compressible material is crushed irreversibly and thus does not ensure any longer the necessary compensation for the different heat expansions of these materials, with the risk of a leak of the catalyst contained in the bed.

A second drawback is connected with the first and lies in the fact that the compressible material tends to deteriorate rapidly in time because of the unavoidable passage of the gas through it which erodes it.

Consequently, even after a brief period of operation of the synthesis reactor it is no longer possible to ensure optimal and reliable catalyst seal by the connection device.

A third drawback of the connection device in accordance with the prior art is that if the space created between the shell and the bottom plate of the catalytic bed is less than the difference in expansion of the materials there is the possibility of damage to the bottom plate which is-pressed against the shell wall.

Lastly, the installation of the device according to the prior art in existing synthesis reactors is problematic from the constructional and the assembly viewpoint, making practical implementation difficult and especially of not negligible cost.

SUMMARY OF THE INVENTION

The technical problem underlying the present invention is to make available an exothermic heterogeneous catalytic synthesis reactor comprising a catalyst-seal support device which would allow achievement of a reliable and durable catalyst seal between the shell wall and the bottom plate of the catalytic bed, and which at the same time would be simple to be obtained.

The technical problem is solved according to the present invention by a reactor of the type set forth above characterized in that it comprises a catalyst-seal support device comprising an annular element placed between said shoulder and said bottom plate, with said annular element fixed in a removable manner with said bottom plate and having a thermal expansion coefficient substantially equal to the thermal expansion coefficient of the shell.

According to the present invention it was found that thanks to the presence of an annular element with a thermal expansion coefficient substantially equal to that of the external shell and placed between the shoulder and the bottom plate, it is possible to ensure an optimal and durable catalyst seal between the shell wall and the bottom plate of the catalytic bed.

In fact, upon each increase or decrease of the temperature inside the synthesis reactor the annular element is deformed analogously to the external shell, while pulling during deformation the overlying bottom plate associated therewith.

In this manner, the distance between the bottom plate and the shell can be held constant to ensure optimal and long-lasting catalyst seal at the same time.

The device comprised in the reactor according to the present invention can then be effectively employed either when the expansion coefficients of the shell and the bottom plate are equal or when the expansion coefficient of the shell is less or more than that of the bottom plate, avoiding possible structural damage to the bottom plate and respectively preventing leakage of catalyst from the catalytic beds through the space which would be created between the bottom plate and the shell.

The annular element comprises advantageously a plurality of structurally independent arched portions.

The bottom plate is in turn advantageously made up of a plurality of plate-shaped elements, such as e.g. in the shape of side-by-side circular sectors having a degree of freedom, i.e. with at least one floating end, free of constraint.

Each element of the bottom plate comprises generally a net for retention of the catalyst supported by a grid associated in a removable manner with the annular element.

If the diameter of the external shell of the synthesis reactor is greater than approximately 1000 mm it is preferable to support the grid with appropriate supporting beams.

Thanks to the particular thermal expansion coefficient of the annular element the device can be advantageously used to compensate for even large dimensional variations in equipment such as e.g. methanol synthesis reactors operating at high temperatures and subject to differentials expansions notoriously on the order of 5 mm to 15 mm.

In addition, the device comprised in the reactor in accordance with the present invention does not exhibit the problems of deterioration mentioned above with reference to the prior art and can thus be employed in any type of operational situation while ensuring long service life.

Another advantage of the present invention lies in the simplicity of implementation of the catalyst-seal support device which permits installation thereof in existing synthesis reactors.

Indeed, an annular element provided by a plurality of structurally independent arched portions, has the dual advantage of being easy to install in the reactor and adapting readily and well to the internal wall of the shell which in a synthesis reactor is usually irregular.

In this last case, the presence of the annular element permits advantageously keeping the bottom plate constantly near the irregular wall of the shell to ensure the best catalyst seal.

In accordance with a further aspect, the present invention relates to the use of a support device as set forth in the appended claims.

The characteristics and advantages of the present invention are set forth in the description of an embodiment thereof given below by way of non-limiting example with reference to the annexed drawings.

DETAILED DESCRIPTION OF A PREFERRED EMBODIMENT

Figure 1:
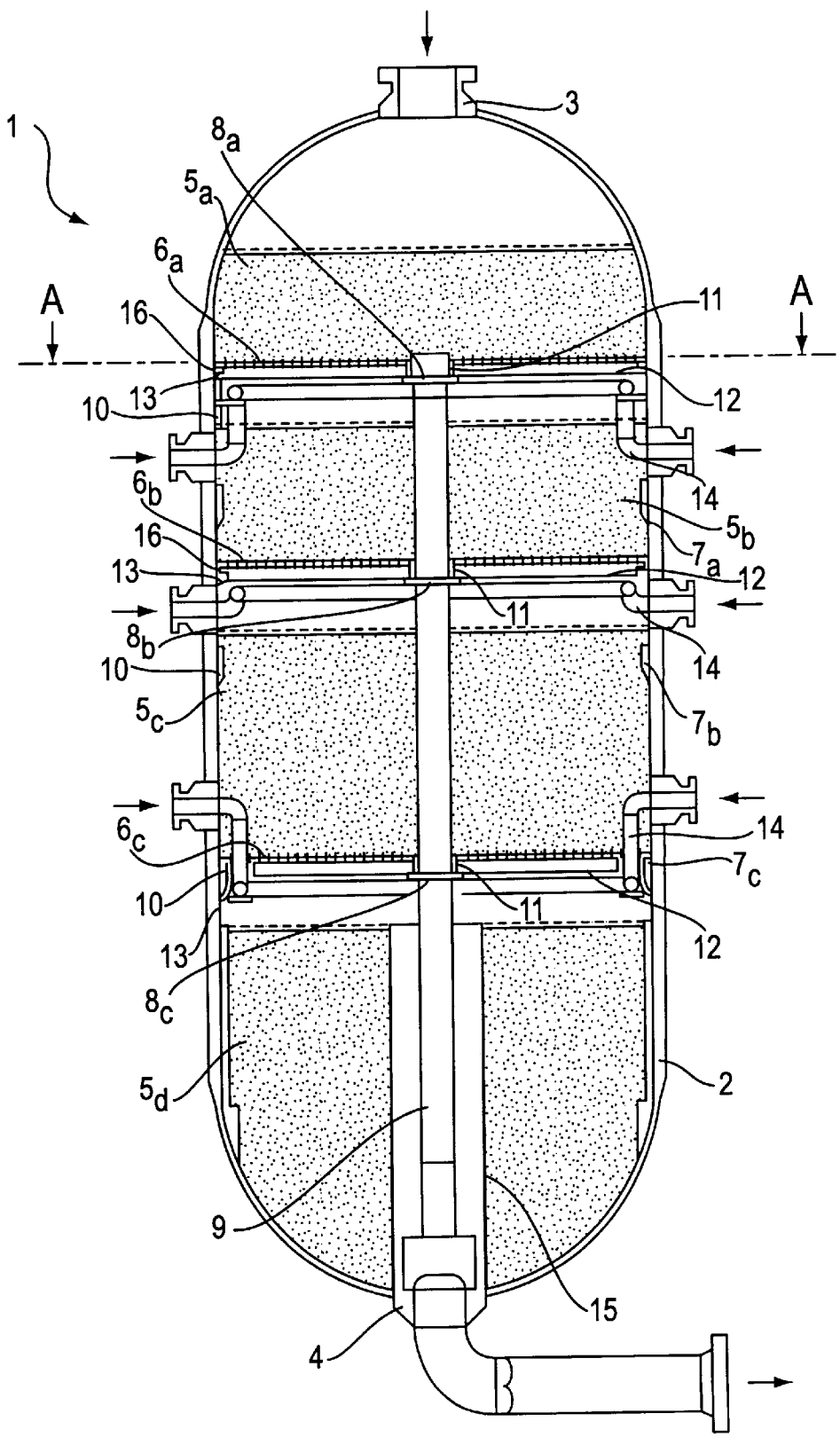
FIG. 1 shows a longitudinal cross section view of a first exothermic heterogeneous catalytic synthesis reactor incorporating a catalyst-seal support device in accordance with the present invention.

In FIG. 1, reference number 1 indicates as a whole a exothermic heterogeneous catalytic synthesis reactor, in particular for methanol synthesis.

The reactor 1 comprises a tubular external shell 2 having at the top an opening 3 for input of reagent gasses, and at the bottom an opening 4 for output of the reaction products.

Reference numbers 5a–5d indicated respectively catalytic beds arranged in mutually spaced relationship inside the shell 2. Between these, the beds 5a–5c are limited below by respective gas-permeable bottom plates 6a–6c adjacent to the shell 2.

The bottom plates 6a–6c are supported by means of the annular shoulders 7a–7c extending from the shell 2 in cooperation with the annular shoulders 8a–8c formed on a tubular beam 9 extending coaxially with the reactor 1.

Between the bottom plate 6a–6c and the shoulders 7a–7c and 8a–8c are provided opposed supporting elements 10, 11 of variable height, which support at predetermined distances the bottom plates 6a–6c. Preferably each of these supporting elements 10, 11 comprises a tubular skirt or alternatively a plurality of substantially rod-shaped struts.

Between two adjacent catalytic beds 5a–5d is also provided a gaseous flow mixing unit of conventional type and comprising a baffle 12 and an annular opening 13 and a perforated distributor 14 for a cooling gas stream.

The catalytic bed 5d has a gas-permeable side wall 15 permitting the reaction products emerging from the bed 5d to reach the opening 4.

Figure 2:
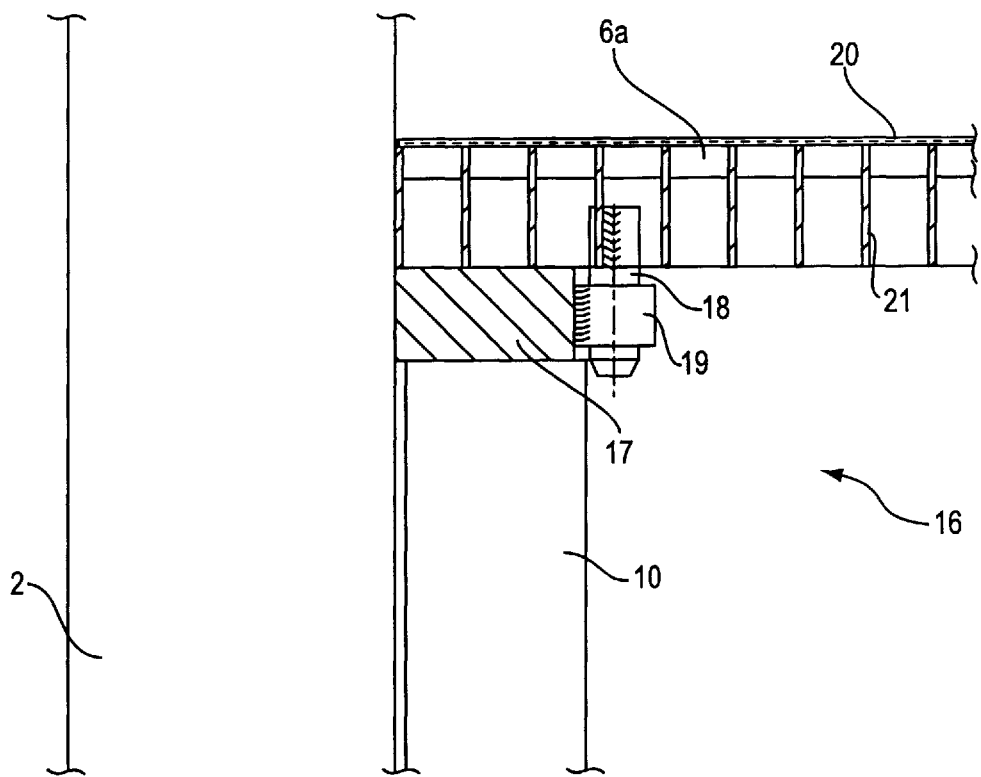
FIG. 2 shows a front cross section view in enlarged scale of some details of the catalyst-seal support device incorporated in the reactor of FIG. 1.
Figure 3:
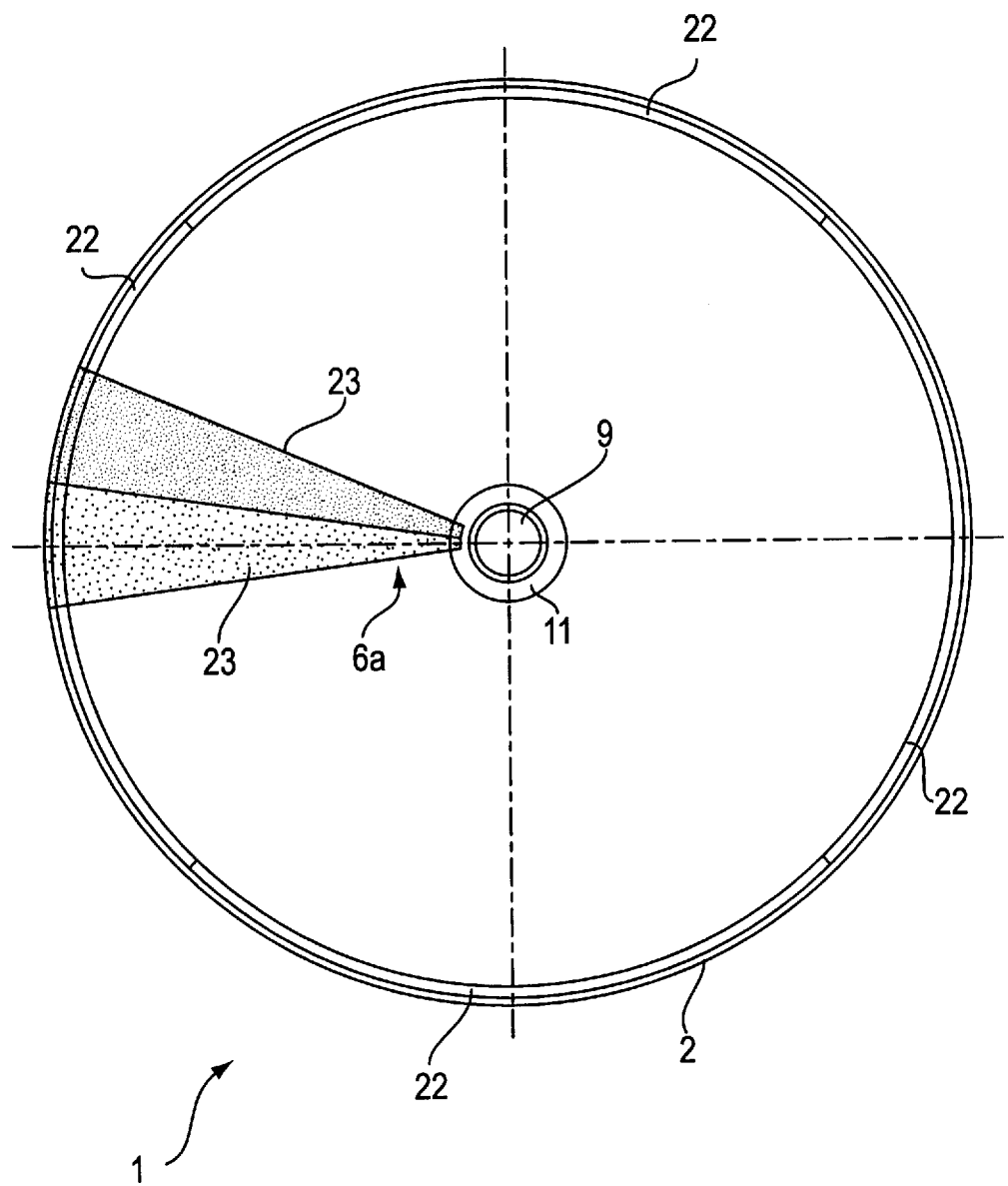
FIG. 3 shows a cross section view of the reactor of FIG. 1, taken along lines A—A of FIG. 1.

With reference to FIGS. 1 to 3 reference number 16 indicates as a whole a catalyst-seal support device in accordance with the present invention.

The catalyst-seal support device 16 comprises an annular element 17 placed between the annular shoulder 7a–7c and the bottom plate 6a–6c with which it is associated in a removable manner.

Specifically, the annular element 17 is rested on the supporting element 10 and is associated in a removable manner with the gas-permeable bottom plate, for example the plate 6a of the bed 5a, by means of suitable pins 18 inserted in respective rings 19 fixed to the annular element 17.

As an alternative to the rings 19 there can be provided housing seats (not shown) made in the surface of the annular element in contact with the bottom plate and designed to house respective pins 18.

Advantageously, the annular element 17 possesses a thermal expansion coefficient substantially equal to the thermal expansion coefficient of the shell 2 so as to be able to change size in a manner similar to that of the shell when the reactor is subjected to sudden changes of temperature.

The bottom plate 6a–6c is freely floating on one side on the support 11 and on the opposite side is associated in a removable manner with the annular element 17 and thus follows the dimensional changes of the latter while remaining constantly near or in contact with the shell 2 to provide therewith a reliable and long-lasting catalyst seal.

In this manner it is possible to avoid occurrence, during operation of the synthesis reactor 1, of undesired phenomena such as for example leaking of the catalyst from the catalytic beds 5a–5d or the risk of structural damage to the bottom plate 6a–6c, typical of devices in accordance with the prior art with stuffing box seal.

Preferably, the annular element consists of the same material as the shell 2 which in the case of an exothermic heterogeneous catalytic synthesis reactor such as that for methanol can be a low-alloy steel, e.g. 1.25 Cr—0.5 Mo.

The bottom plate 6a and the bottom plates 6b and 6c, comprise advantageously a net 20 for retention of the catalyst and a supporting grid 21 beneath the net 20.

The supporting elements 10 and 11 rest on the respective annular shoulders 7a–7c and 8a–8c and have the purpose of spacing the catalytic beds 5a–5c in the desired manner so as to better utilize the useful volume of the synthesis reactor. Their use is thus quite optional.

Figure 6:
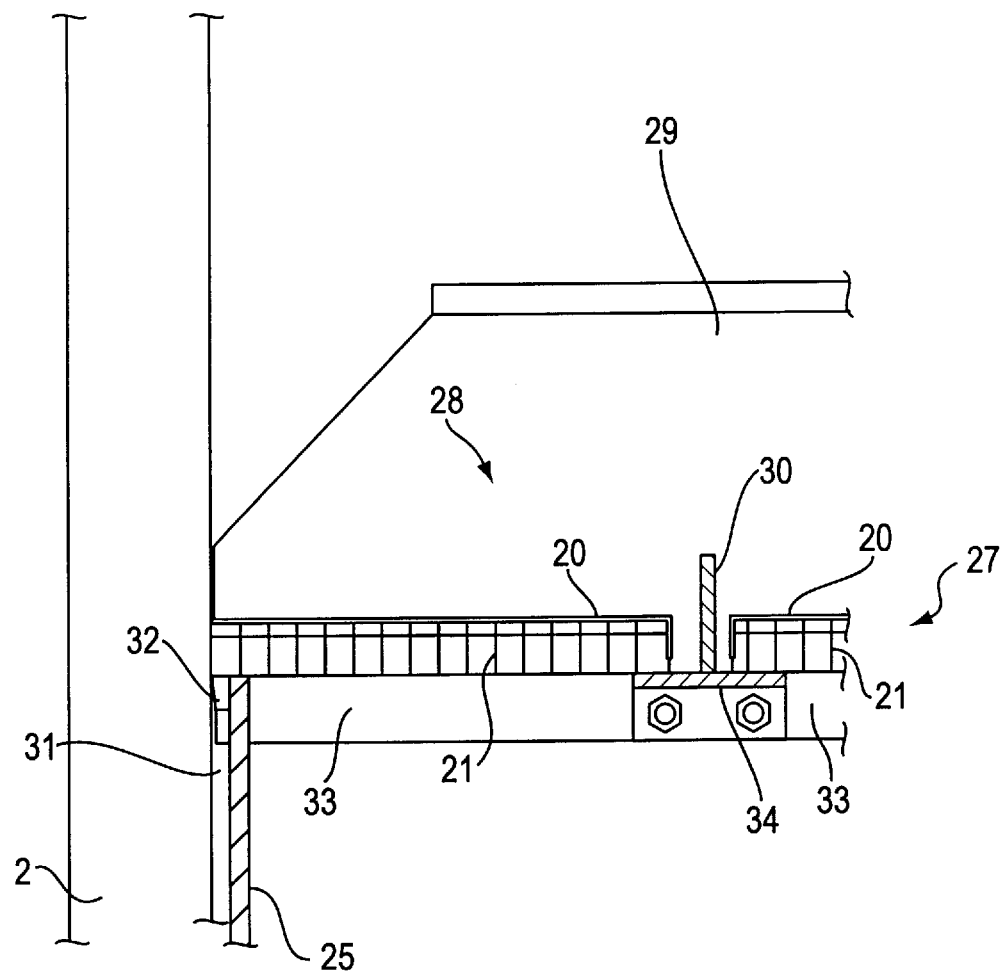
FIG. 6 shows a front cross section view in enlarged scale of some details of the catalyst seal device incorporated in the reactor of FIG. 4, taken along lines C—C of FIG. 5.

As an alternative, the supporting element 10 can be replaced by the annular element 17 which in this case will have the dual function of providing a catalyst seal between bottom plate and shell wall, and spacing the catalytic beds 5a–5c. According to this particular embodiment which is shown in FIG. 6, the bottom plate 6a–6c is fixed in a removable manner to the annular element 17 by means of a plurality of pins extending from the bottom plate and housed in a space defined between the annular element 17 and the shell 2.

In FIG. 3 it is possible to observe how the annular element 17 is preferably made up of a plurality of arched portions 22 which are four in this specific case and structurally independent and fixed together e.g. by means of conventional bolts not shown.

The bottom plate 6a just as the bottom plates 6b and 6c are in turn made up of a plurality of circular sectors 23 arranged side-by-side. For the sake of clarity FIG. 3 shows only two circular sectors 23.

The end of the circular sectors 23 opposite the annular element 17 is rested in an overhanging manner on the support element 11. In this manner the circular sectors 23 are free to follow the dimensional changes of the annular element 17 with which they are associated in a removable manner.

In an alternative embodiment not shown there is also provided a plurality of radial supporting beams placed between the annular element 17 and the respective circular sectors 23.

Figure 4:
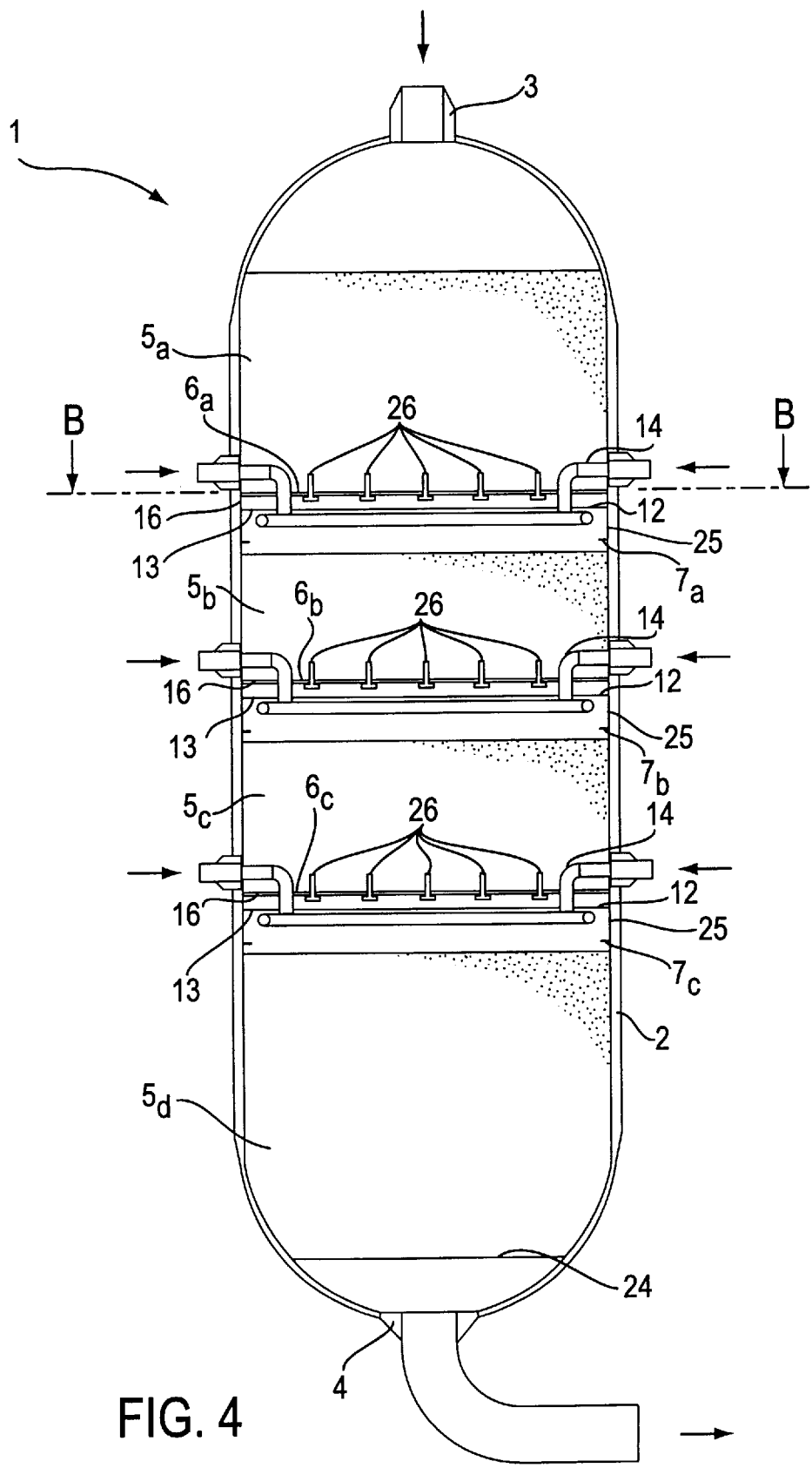
FIG. 4 shows a longitudinal cross section view of a second exothermic heterogeneous catalytic synthesis reactor incorporating a catalyst-seal support device in accordance with the present invention.

FIG. 4 shows as a whole an exothermic heterogeneous catalytic synthesis reactor, in particular for methanol synthesis, incorporating a catalyst-seal support device in accordance with the present invention.

In this figure the details of the reactor 1 structurally and functionally equivalent to those shown in FIGS. 1–3 are indicated by the same reference signs and not further described.

The catalytic bed 5d has a gas-permeable bottom plate 24 permitting the reaction products emerging from the bed 5d to reach the opening 4.

Figure 5:
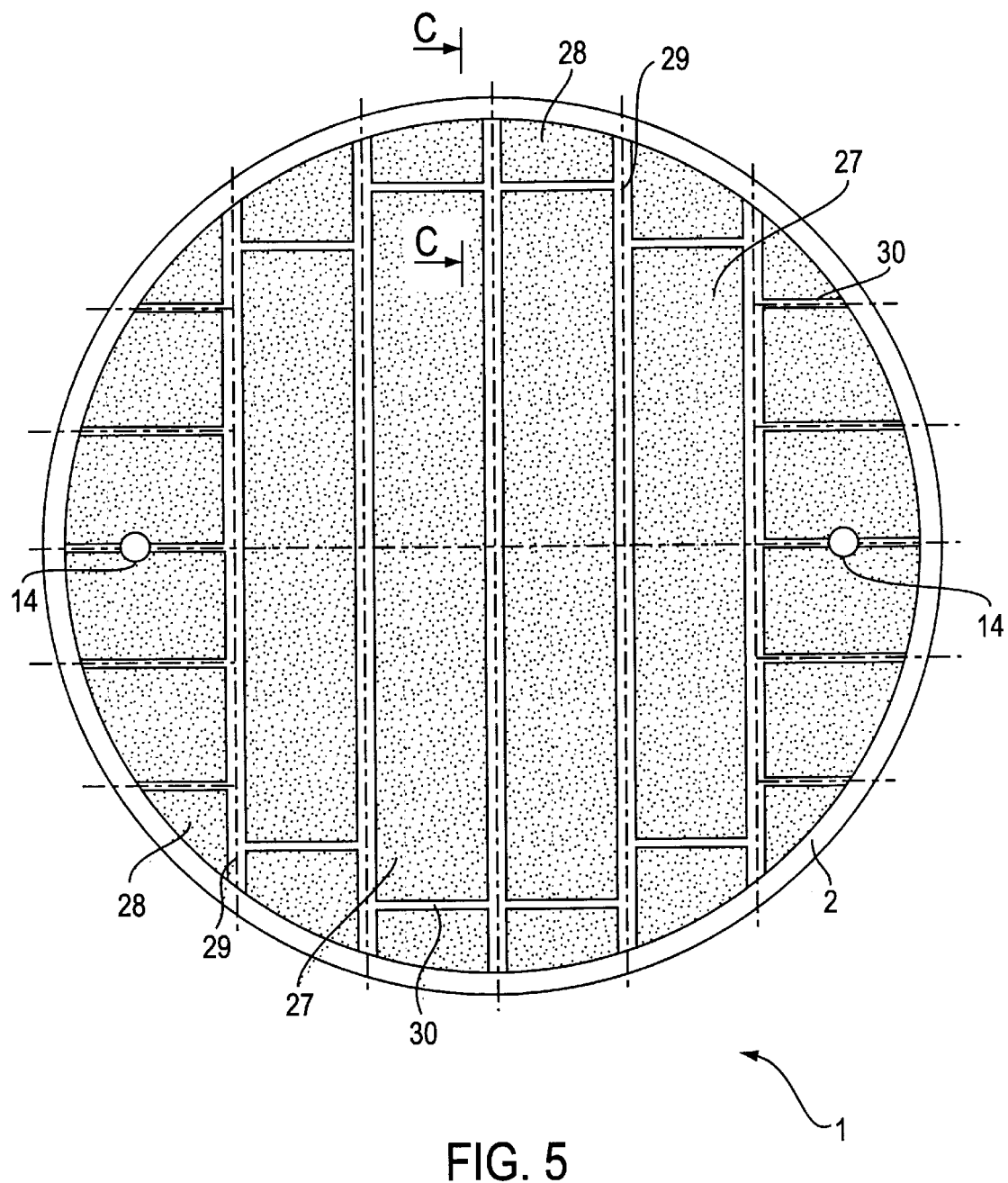
FIG. 5 shows a cross section view of the reactor of FIG. 4, taken along lines B—B of FIG. 4.

With reference to FIGS. 4 to 6 the catalyst-seal support device provided in accordance with the present invention and indicated as a whole by 16, comprises an annular element 25 placed between the annular shoulder 7a–7c and the bottom plate 6a–6c with which it is associated in a removable manner.

The bottom plates 6a–6c are supported in a mutually spaced relationship in the shell 2 by means of respective annular elements 25 rested on the annular shoulders 7a–7c, in co-operation with a plurality of supporting T beams 26.

In this particular embodiment of the present invention, the annular element 25 fulfils, in addition to the function of catalyst seal between the bottom plate and the shell wall, the function of spacing the catalytic beds 5a–5c since it is made in the form of a tubular skirt. As an alternative, there can be provided supporting elements 10 of the conventional type placed between the annular element, appropriately modified, and the shoulders, as illustrated in FIG. 1.

FIG. 5 shows how the bottom plate 6a, similarly to the bottom plates 6b–6c, comprises a plurality of central plate-shaped elements 27 and peripheral plate-shaped elements 28. The supporting beams 26 are distinguished in turn between the main primary beams 29 and the secondary beams 30.

The central plate-shaped elements 27 are supported longitudinally by the primary beams 29 and transversely by the secondary beams 30.

The secondary plate-shaped elements 28 are supported, in addition to the beams 29 and 30, also by the annular element 25 with which they are associated in a removable manner as shown in FIG. 6.

Between the annular element 25 and the shell 2 is advantageously defined a space 31 in which are housed a plurality of pins 32 extending from the peripheral plate-shaped elements 28.

The end of the plate-shaped peripheral elements 28 opposite the annular element 25 is rested in an overhanging manner on the wings 33, 34 of the main beams 29 and secondary beams 30, respectively. In this manner the plate-shaped sectors 23 are free to follow the dimensional changes of the annular element 25 with which they are associated in a removable manner to thus ensure a reliable and long-lasting catalyst seal.

The annular element 25 can be provided enbloc or can comprise a plurality of structurally independent arched portions as shown in the example of FIG. 3.

The above discussion clarifies the numerous advantages achieved by the catalyst-seal support device comprised in the reactor according to the present invention. In particular there is achieved between the external shell and the bottom plate of the catalytic beds an effective constant and long-lasting catalyst seal which ensures the synthesis reactor a reliability not previously achievable with the connecting devices in accordance with the prior art.

What is claimed is:

1. Exothermic heterogeneous catalytic synthesis reactor comprising:
   a substantially cylindrical external shell,
   at least one catalytic bed arranged in said shell and comprising a bottom plate for catalyst containment,
   at least one supporting shoulder for said bottom plate extending from said shell, and
   a catalyst-seal support device comprising an annular element removably placed between said shoulder and said bottom plate with said annular element connected in a removable manner with said bottom plate and having a thermal expansion coefficient substantially equal to that of the shell.

2. Reactor according to claim 1, wherein said bottom plate rests on said annular element.

3. Reactor according to claim 1, wherein said annular element rests on said shoulder.

4. Reactor according to claim 1, wherein said annular element comprises a plurality of structurally independent arched portions.

5. Reactor according to claim 1, wherein said annular element consists of the same material as said shell.

6. Reactor according to claim 1, further comprising a supporting element for said bottom plate disposed between said annular element and said shoulder.

7. Reactor according to claim 1, wherein said bottom plate for containment of the catalyst comprises a plurality of circular sectors.

8. Reactor according to claim 7, wherein said circular sectors are connected in a removable manner to said annular element by means of a plurality of pins extending from said bottom plate and housed in respective seats associated with said annular element.

9. Reactor according to claim 7, wherein said circular sectors are connected in a removable manner to said annular element by means of a plurality of pins extending from said bottom plate and housed in a space defined between said annular element and said shell.

10. Reactor according to claim 7, wherein an end of said circular sectors opposite said annular element rests in an overhanging manner on a supporting beam extending coaxially with said shell.

11. Reactor according to claim 1, wherein said bottom plate for containment of the catalyst comprises a plurality of plate-shaped elements supported at least in part by said annular element.

12. Reactor according to claim 11, wherein said plate-shaped elements are connected in a removable manner to said annular element by means of a plurality of pins extending from said plate-shaped elements and housed in a space defined between said annular element and said shell.

13. Reactor according to claim 11, wherein ends of said plate-shaped elements not supported by said annular element rest in an overhanging manner on a plurality of T beams.

14. Use of a support device comprising: providing an annular element for effecting catalyst-seal in an exothermic heterogeneous catalytic synthesis reactor; said reactor comprising a substantially cylindrical external shell, at least one catalytic bed arranged in said shell and comprising a bottom plate for containment of the catalyst bed, at least one supporting shoulder for said bottom plate extending from said shell, removably placing said annular element between said shoulder and said bottom plate and removably connecting said annular element to said bottom plate, said annular element having a thermal expansion coefficient substantially equal to the thermal expansion coefficient of the shell.

15. Use according to claim 14, wherein said annular element rests on said shoulder.

16. Use according to claim 14, wherein said annular element comprises a plurality of structurally independent arched portions.

17. Use according to claim 14, wherein said annular element consists of the same material as said shell.

* * * * *